United States Patent
Kawatani

(10) Patent No.: US 8,636,092 B2
(45) Date of Patent: Jan. 28, 2014

(54) SADDLE RIDING TYPE ELECTRIC VEHICLE

(71) Applicant: Honda Motor Co., Ltd., Tokyo (JP)

(72) Inventor: Shinji Kawatani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/847,600

(22) Filed: Mar. 20, 2013

(65) Prior Publication Data

US 2013/0277132 A1    Oct. 24, 2013

(30) Foreign Application Priority Data

Mar. 30, 2012  (JP) .................................. 2012-079025

(51) Int. Cl.
  *B60K 1/00*    (2006.01)
(52) U.S. Cl.
  USPC .......................................... 180/68.5; 180/220
(58) Field of Classification Search
  USPC ....................................... 180/220, 68.5, 65.1
  See application file for complete search history.

(56) References Cited

U.S. PATENT DOCUMENTS

| | | | | |
|---|---|---|---|---|
| 4,077,485 A | * | 3/1978 | Bonora et al. | 180/68.5 |
| 4,723,618 A | * | 2/1988 | Coonradt | 180/68.5 |
| 5,789,898 A | * | 8/1998 | Suzuki et al. | 320/104 |
| 2007/0007064 A1 | * | 1/2007 | Okamoto et al. | 180/220 |
| 2010/0133030 A1 | * | 6/2010 | Johnson et al. | 180/68.5 |
| 2010/0237585 A1 | * | 9/2010 | Binggeli et al. | 280/288.4 |

FOREIGN PATENT DOCUMENTS

JP     2010-083332     4/2010

* cited by examiner

*Primary Examiner* — Tashiana Adams
(74) *Attorney, Agent, or Firm* — Squire Sanders (US) LLP

(57) ABSTRACT

A battery is integrated with a down frame and a bottom frame. When fixation of the battery to a main frame is released upon release of locking means, the down frame, the bottom frame, and the battery are allowed to swing pivotally around an engagement position where the bottom frame is engaged with pivot frames. A front wheel is located on at least any one of swing loci of the down frame, the bottom frame, and the battery drawn when the down frame, the bottom frame, and the battery swing pivotally around the engagement position. The front wheel deviates from the swing locus in a state where the handlebar is turned.

14 Claims, 9 Drawing Sheets

(A)

(B)

SADDLE RIDING TYPE ELECTRIC VEHICLE

BACKGROUND

1. Field

The present invention relates to a saddle riding type electric vehicle.

2. Description of the Related Art

Patent Document 1 (Japanese Patent Application Publication No. 2010-83332) discloses a saddle riding type electric vehicle which includes: one main frame extending rearward from a head pipe; a pivot frame extending downward from a rear end of this main frame; a down frame extending downward from a front end of the main frame; and a bottom frame extending rearward from a lower end of the down frame and having a rear end connected to the pivot frame. In this saddle riding type electric vehicle, a battery is provided in a space formed by the group of frames in a detachably-attached manner.

Although a saddle riding type electric vehicle that secures a space for housing a large-capacity battery can run for a long distance, an operation to attach or detach the large battery entails a lot of time and labor. In this regard, the conventional saddle riding type electric vehicle intends to improve the workability by making the bottom frame detachable. Still, there is room for further improvement.

Moreover, the saddle riding type electric vehicle of this type needs an anti-theft measure for a battery which is detachably mounted.

SUMMARY

The present invention has been made in view of the aforementioned circumstances, and an object thereof is to provide a saddle riding type electric vehicle having a configuration in which a battery is provided in a space formed by a group of frames of a vehicle body frame in a detachably-attached manner, and being capable of improving the workability of an operation to detach the battery and easily obtaining an anti-theft effect of the battery.

As means for solving the foregoing problems, a first embodiment of the invention provides a saddle riding type electric vehicle including a main frame extending rearward from a head pipe. A pivot frame extends downward from a rear end of the main frame, and a down frame extends in a vertical direction below a front part of the main frame. A bottom frame extends rearward from a lower end of the down frame and having a rear end connected to the pivot frame. A battery is provided in a detachably-attached manner in a space formed by the main frame, the down frame, the bottom frame, and the pivot frame. The battery is integrated with the down frame and the bottom frame, and the bottom frame is engaged in a detachably-attached manner with the pivot frame by engaging means provided between the bottom frame and the pivot frame. Any one of the down frame and the battery is fixed to the main frame in a detachably-attached manner by a lock provided between the main frame and the down frame or the battery. The down frame, the bottom frame, and the battery are configured to swing pivotally around an engagement position where the bottom frame is engaged with the pivot frame when the lock is released and the fixation of the down frame or the battery to the main frame is released. A steering shaft is turnably supported by the head pipe, and a handlebar is provided at an upper part of the steering shaft. A wheel is provided at a lower part of the head pipe, and the wheel is located in front of the down frame. When the handlebar is in a state of not being turned, the wheel is located on at least any one of swing loci of the down frame, the bottom frame, and the battery drawn when the down frame, the bottom frame, and the battery swing pivotally around the engagement position, and the wheel restricts detachment of the battery from a vehicle body. When the handlebar is in a state of being turned, the wheel deviates from the swing locus and thereby allows the detachment of the battery from the vehicle body.

In another embodiment, the vehicle further includes a handlebar lock mechanism configured to restrict a turn of the handlebar. The handlebar lock mechanism includes a pin member configured to protrude toward the steering shaft by an operation of a key. A handlebar lock restricting member placed on an outer circumference of the steering shaft and extends in a circumferential direction of the steering shaft. At least while the handlebar is in the state of not being turned, the pin member is opposed to the handlebar lock restricting member, and the protrusion of the pin member to the inside of the handlebar lock restricting member in a radial direction of the steering shaft is thereby restricted. The handlebar lock restricting member is located in such a manner as not to be opposed to the pin member while the handlebar is in a state of being turned from the unturned state to left or right by a predetermined angle or more. The pin member is configured to protrude to the inside of the handlebar lock restricting member in the radial direction of the steering shaft while the handlebar is in the state of being turned to the left or right by the predetermined angle. The pin member sets the handlebar into a handlebar locked state by being aligned with the handlebar lock restricting mechanism in the circumferential direction of the steering shaft when the pin member comes to a first protruding position where the pin member protrudes to the inside of the handlebar lock restricting mechanism in the radial direction of the steering shaft by an operation of the key. The front wheel deviates from the swing locus while the handlebar is in the state of being turned from the unturned state to the left or right by the predetermined angle. The lock is released by locating the pin member of the handlebar lock mechanism in the first protruding position, setting the handlebar into the handlebar locked state, and then further performing a predetermined operation on the handlebar lock mechanism.

In another embodiment, the pin member is allowed to protrude to a second protruding position where the pin member protrudes further inward from the first protruding position in the radial direction of the steering shaft while the handlebar is in the state of being turned from the unturned state to the left or right by the predetermined angle. The lock works in conjunction with the operation of the key, and is released when the pin member is located in the second protruding position.

In another embodiment, the handlebar lock mechanism includes a cylinder into which to insert the key, and which enables a turning operation to be performed on the inserted key. The cylinder includes a shaft portion configured to be turned by an operation of the key. The shaft portion is engaged with an arm member configured to release the lock when the pin member comes to the first protruding position. The shaft portion provides the arm member with an acting force for releasing the lock when the key is further operated in such a manner as to move the pin member toward the second protruding position.

In another embodiment, a battery lock restricting member extends in the circumferential direction of the steering shaft, and is further fixed to the outer circumference of the steering shaft. The battery lock restricting member is located in a position which is inward of the handlebar lock restricting member in the radial direction of the steering shaft, such that at least part of the battery lock restricting member does not overlap the handlebar lock restricting member in the radial direction. The battery lock restricting member is placed in a position where the protrusion of the pin member from the first protruding position to the second protruding position is restricted while the handlebar is in the state of being turned from the unturned state to one of the left and right by the predetermined angle.

In another embodiment, the handlebar lock mechanism is configured to switch the start and stop of the saddle riding type electric vehicle, in addition to setting the handlebar into the handlebar locked state and releasing the lock, by operation of the key.

In another embodiment, a roller configured to touch the ground when the lock is released is provided at a junction of the down frame and the bottom frame.

According to certain embodiments, the battery integrated with the down frame and the bottom frame can be detached by releasing the lock for fixing either the down frame or the battery to the main frame, and causing the down frame, the bottom frame, and the battery to swing pivotally around the engagement position between the bottom frame and the pivot frame. Then, the bottom frame is detached from the pivot frame. Thus, an operation to detach the battery, which is a heavy object, can be performed relatively smoothly, and workability of the operation to detach the battery can be improved.

In addition, the configuration in which detachment of the battery is prohibited unless predetermined procedures are performed is established by allowing the swing and detachment of the battery while the handlebar is turned. Thus, an anti-theft effect of the battery can easily be obtained. Further, while the handlebar is in the unturned state, the wheel is located on at least any one of swing loci of the down frame, the bottom frame, and the battery. However, since the battery is made detachable by turning the handlebar, the battery in the state attached to the vehicle body can have a structure enlarged toward the wheel, and a capacity of the battery can also be secured.

According to some embodiments, the lock is released and the swing and detachment of the battery swung is allowed only while in the handlebar locked state. Thus, it is possible to prevent an erroneous operation of a user from causing the battery to interfere with the wheel.

According to certain embodiments, the lock and the handlebar lock mechanism can be made to work in conjunction with each other, whereby the lock is released after the handlebar locked state is established. Thus, it is possible to reliably prevent a user from causing the battery to interfere with the wheel due to an erroneous operation.

According to certain embodiments, the lock can be released by use of a turn of the shaft portion configured to be turned in conjunction with an operation of the key.

According to some embodiments, the lock is not allowed to be released in the state where the handlebar is turned from the unturned state to the left or right by the predetermined angle. Thus, the lock can be made releasable only in a designated direction.

Embodiments of the invention can enable an operation to attach or detach the battery to be performed easily.

Also, some embodiments can enable switching the start and stop as well as locking the handlebar and releasing the locking means to be achieved by operating the single key. Thus, efficient operating means can be realized.

BRIEF DESCRIPTION OF THE DRAWINGS

FIGS. 4(A)-4(B) are views showing locking means included in the saddle riding type electric vehicle observed along the A-A line in FIG. 2, in which FIG. 4(A) is a view showing a state before locking and FIG. 4(B) is a view showing a state after locking.

FIGS. 7A-7C are cross-sectional views of some components taken along the B-B line in FIG. 5 for explaining operations of the handlebar lock mechanism, in which FIG. 7(A) is a view showing an upright state of the wheel, FIG. 7(B) is a view showing a state where the wheel is turned to the left, and FIG. 7(C) is a view showing a state where the wheel is turned to the right.

FIGS. 8(A)-(C) are views for explaining a shaft portion to be turned by an operation of a key provided in the key cylinder of the handlebar lock mechanism, in which: FIG. 8(A) is a view showing a state where the key is not operated; FIG. 8(B) is a view showing a state where the key is turned at a predetermined angle; and FIG. 8(C) is a view showing a state where the key is further turned at another predetermined angle from the state shown in FIG. 8(B).

DETAILED DESCRIPTION

Figure 1:
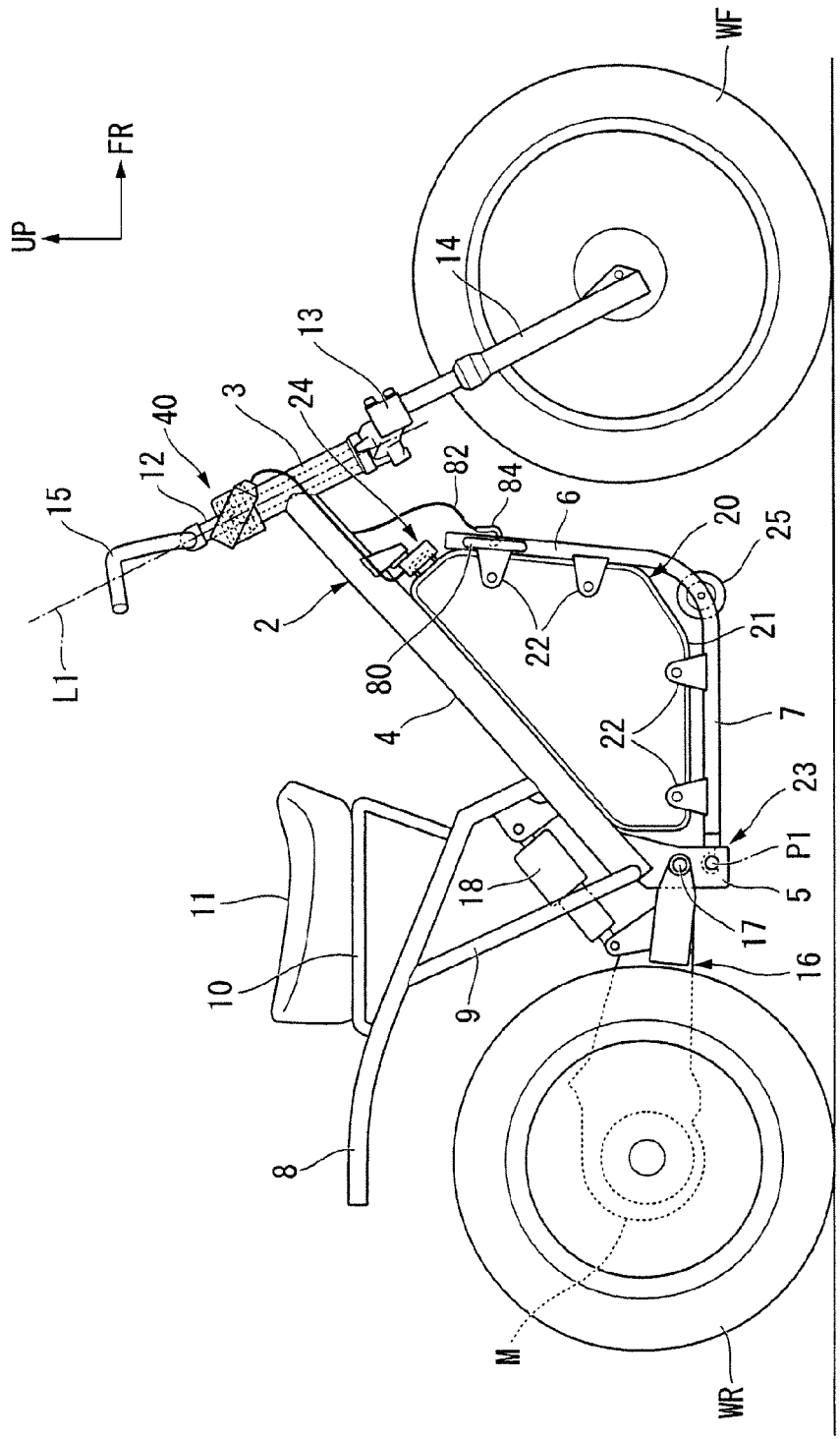
FIG. 1 is a right side view of a saddle riding type electric vehicle according to an embodiment of the present invention.

Embodiments of the present invention will be described below with reference to the drawings. In the drawings used hereinbelow, it is to be noted that an arrow FR indicates a front side of a vehicle, an arrow UP indicates an upper side of the vehicle, and an arrow LH indicates a left side of the vehicle. As shown in FIG. 1, a saddle riding type electric vehicle 1 according to this embodiment includes a vehicle body frame 2 formed of multiple frames.

The vehicle body frame 2 includes a main frame 4 extending rearward, and in this case rearward and downward from a head pipe 3. A left and right pair of pivot frames 5 extend downward from a rear end of the main frame 4. A down frame 6 extends in a vertical direction below a front part of the main frame 4. A bottom frame 7 extends rearward from a lower end of the down frame 6, and has a rear end connected to the pivot frames 5. A left and right pair of seat frames 8 extend rearward and upward from a rear part of the main frame 4. A left and right pair of support frames 9 each extend rearward and upward from a rear end of the main frame 4, and are connected to a region located substantially in the center in a front-rear direction of each seat frame 8.

The down frame 6 and the bottom frame 7 are integrated with each other, and formed into an L-shape in a lateral view. In addition, a seat support frame 10 having a horizontal region, which extends in the front-rear direction and in a horizontal direction, is fixed to upper parts of the seat frames 8. A seat 11 for a driver to be seated on is supported by the horizontal region of this seat support frame 10.

A steering shaft 12 is turnably supported by the head pipe 3. Upper and lower end portions of the steering shaft 12 protrude outward from the head pipe 3. A bridge member 13 extending in a vehicle width direction is fixed to a lower end of the steering shaft 12, and upper ends of front forks 14 are respectively fixed to both end portions of the bridge member 13. In addition, a front wheel WF is rotatably supported by lower ends of the front fork legs 14. A handlebar 15 formed of a single pipe material is fixed to an upper end of the steering shaft 12. In other words, the handlebar 15 is placed on an upper part of the steering shaft 12 while the front wheel WF is placed on a lower part thereof. Note that L1 in the drawing indicates an axial line of the steering shaft 12.

A front portion of a swing arm 16 is swingably supported by the pivot frames 5 via a pivot shaft 17. The swing arm 16 adopts a cantilever type which is configured to pivotally support a rear wheel WR only with an arm on the left side in the vehicle width direction. An electric motor M which drives the rear wheel WR is housed in a rear portion of the swing arm 16. In addition, a rear cushion unit 18 is provided between the seat frames 8 and the front portion of the swing arm 16.

In addition to the electric motor M, a centrifugal clutch as a connection-disconnection mechanism for rotation drive force and a deceleration mechanism (neither of which is shown), as well as a PDU (power drive unit) to control output from the electric motor M are concentratedly arranged inside the swing arm 16. In other words, the swing arm 16 and the electric motor M collectively constitute a swing unit which is a power train of the saddle riding type electric vehicle 1.

A battery 20 configured to supply electric power to the electric motor M is provided in a space formed by the main frame 4, the down frame 6 in a detachably-attached manner, the bottom frame 7, and the pivot frames 5. This battery 20 is configured to house a lithium ion battery and the like in a case 21 formed substantially in a triangular shape in a lateral view.

In the case 21 of the battery 20, one side of the three sides that form the substantially triangular shape in the lateral view is aligned with the vertical direction and fixed to the down frame 6, while a side extending rearward from a lower end of the side fixed to the down frame 6 is aligned with the front-rear direction and fixed to the bottom frame 7. Thus, the battery 20 is integrated with the down frame 6 and the bottom frame 7. The side which is not fixed to any of the down frame 6 and the bottom frame 7 extends along a lower surface of the main frame 4 in the proximity of this lower surface.

Here, reference numeral 22 in the drawing denotes multiple brackets fixed to the down frame 6 and the bottom frame 7, which are configured to anchor the case 21 of the battery 20 by fastening and the like.

In the saddle riding type electric vehicle 1, the bottom frame 7 is engaged with the pivot frames 5 in a detachably-attached manner by engaging means 23 formed between the bottom frame 7 and the pivot frames 5, while an upper part of the battery 20 is fixed to the main frame 4 in a detachably-attached manner by lock 24, also functioning as a locking means, formed between the battery 20 and the main frame 4. In this way, the battery 20 is supported by the main frame 4 and the pivot frames 5. In an embodiment, an upper end of the down frame 6 is separated from the main frame 4 in the vertical direction, and is not directly fixed thereto.

Figure 2:
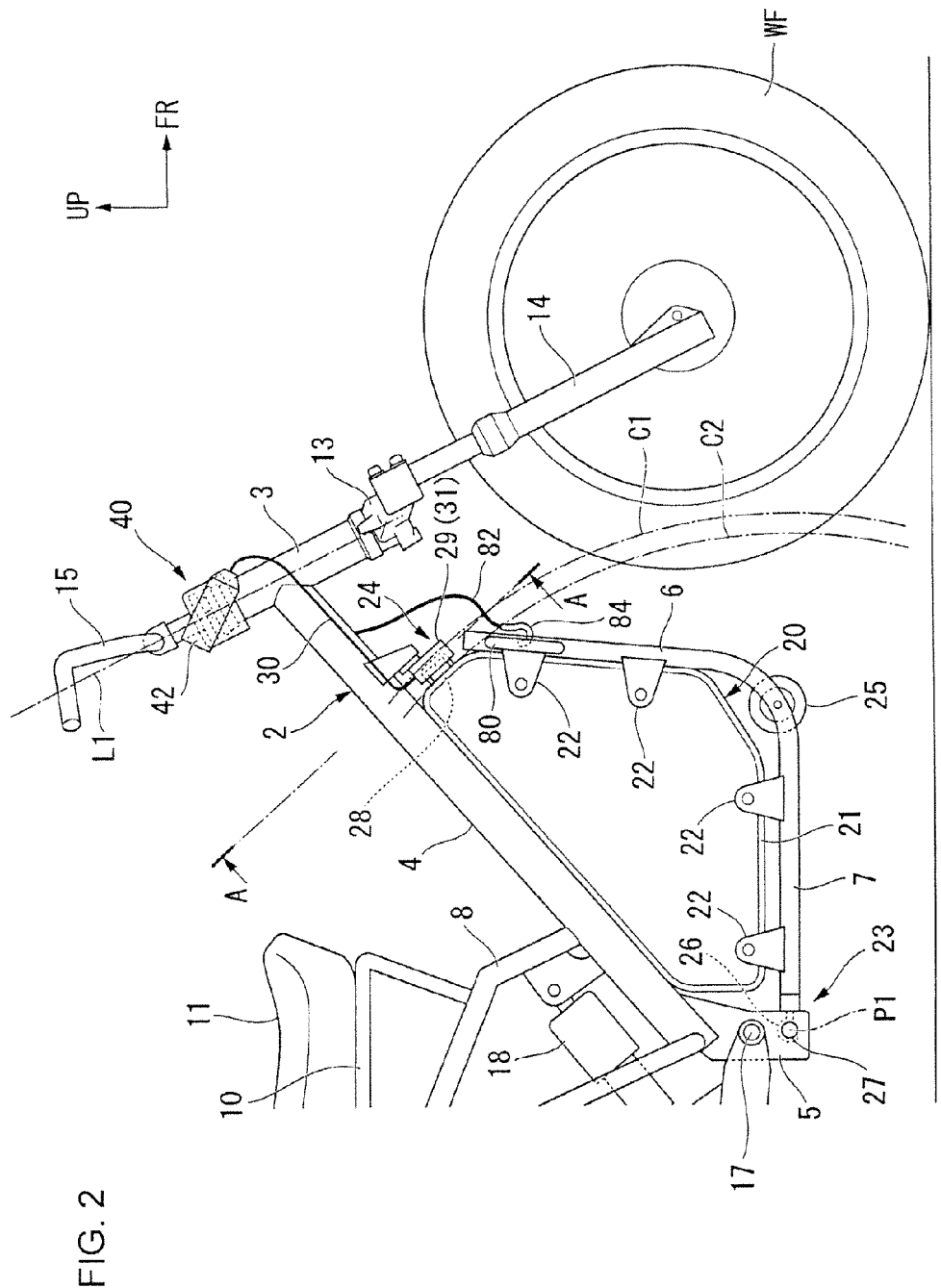
FIG. 2 is a right side view of a vehicle front part of the saddle riding type electric vehicle.
Figure 3:
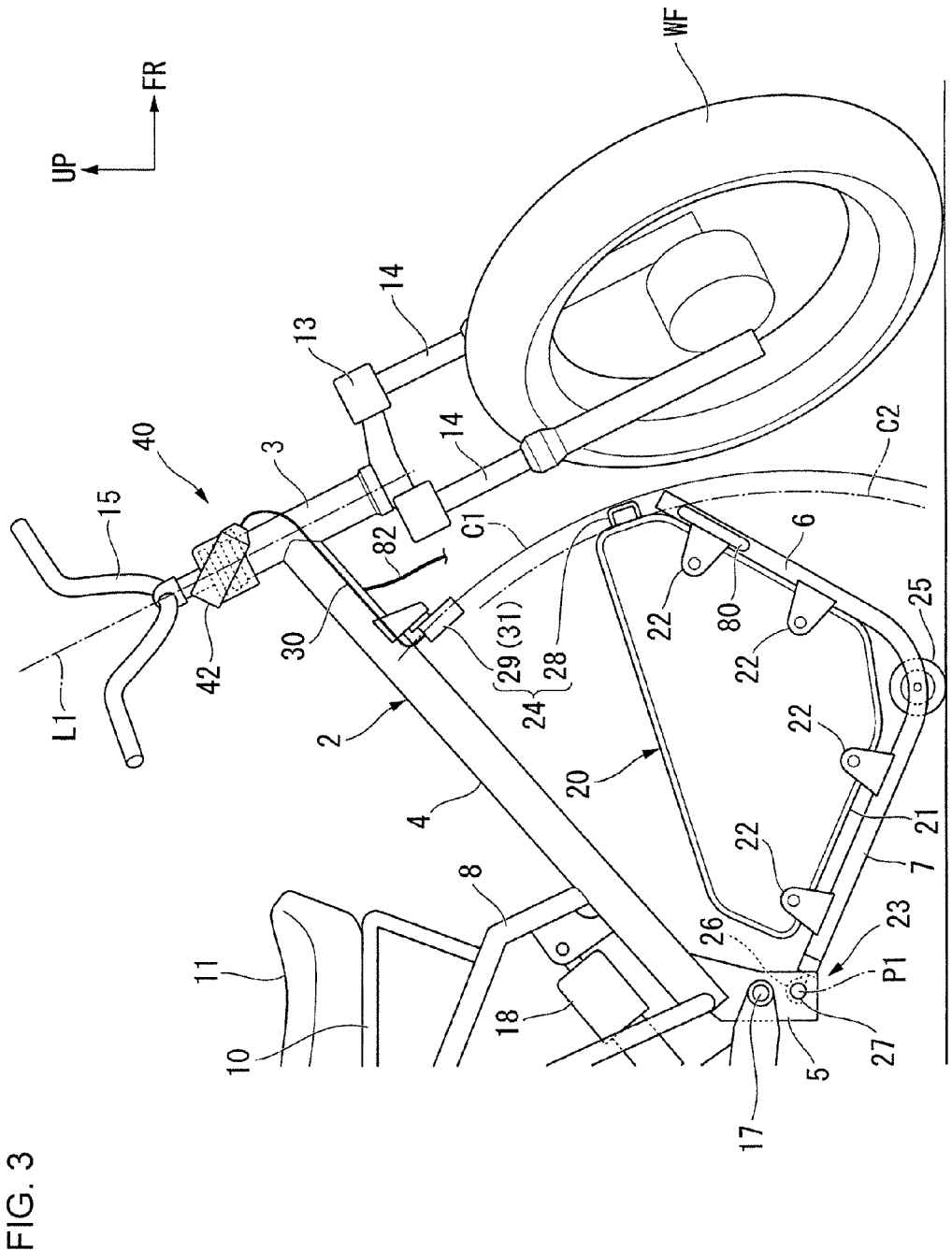
FIG. 3 is a right side view of the vehicle front part of the saddle riding type electric vehicle in a state where a wheel is turned.

Moreover, with reference to FIG. 2 and FIG. 3 together, the down frame 6, the bottom frame 7, and the battery 20 are designed to be detached from the vehicle body by swinging the down frame 6, the bottom frame 7 and the battery 20 pivotally around an engagement position P1, where the bottom frame 7 is engaged with the pivot frames 5, when the fixation of the battery 20 to the main frame 4 is released upon release of the locking means 24. Thereafter, the bottom frame 7 is detached from the pivot frames 5.

Further, with reference to FIG. 2, while the handlebar 15 is in the unturned state, the front wheel WF in this saddle riding type electric vehicle 1 is located on swing loci C1, C2 of the down frame 6 and the battery 20 drawn when the down frame 6, the bottom frame 7, and the battery 20 swing pivotally around the engagement position P1. With reference to FIG. 3, the front wheel WF deviates from the swing loci C1, C2 while the handlebar 15 is in the turned state. Although the drawing shows the state of a right turn, the same applies to the state of a left turn.

Specifically, the saddle riding type electric vehicle 1 is configured to be unable to detach the down frame 6, the bottom frame 7, and the battery 20 successfully unless the handlebar 15 is in the turned state, since the down frame 6 and the battery 20 would otherwise interfere with the front wheel WF.

The swing locus C1 is a locus which is drawn by a front edge at an upper end of the down frame 6, which is a region of the down frame 6 located farthest from the engagement position P1, while the down frame 6 swings around the engagement position P1. The swing locus C2 is a locus which is drawn by an upper part of the case 21, which is a region of the case 21 located farthest from the engagement position P1, while the battery 20 swings around the engagement position P1. Here, as shown in FIG. 3, a roller 25 configured to be located away from the ground when the locking means 24 is fixed and to be grounded when the locking means 24 is released is provided at a junction (a connecting position) of the down frame 6 and the bottom frame 7. Meanwhile, in FIGS. 1 to 3, reference numeral 80 denotes a U-shaped handle portion provided on a right side surface of an upper part of the down frame 6 and protruding rightward in the vehicle width direction. In addition, a cable 82 is fixed to a lower surface of an upper end of the main frame 4 and protrudes downward, and a hook 84 is connected to a lower end of this cable 82, as shown in FIG. 1 and FIG. 2. The hook 84 is engaged with a front surface of the upper part of the down frame 6 in a detachably-attached manner, and the cable 82 sags in this engagement state. When the down frame 6, the bottom frame 7, and the battery 20 swing pivotally around the engagement position P1, this cable 82 establishes a state of tension in predetermined swing positions of these components, and functions in such a manner as to support the components.

In one embodiment, the engaging means 23 includes a hook 26 fixed to a rear end of the bottom frame. A bar 27 is stretched between the left and right pivot frames 5. The bottom frame 7 is configured to be turnably engaged with the pivot frames 5 as the hook 26 is engaged with an outer circumference of the bar 27. The locking means 24 in this embodiment includes a striker 28 provided on the upper part of the case 21 and protruding forward and upward to a space between the main frame 4 and the upper end of the down frame 6. A latch 29 is fixed to the lower surface of the main frame 4. The locking means 24 adopts a structure to fix the battery 20 to the main frame 4 by locking the striker 28 with the latch 29.

Figure 4:
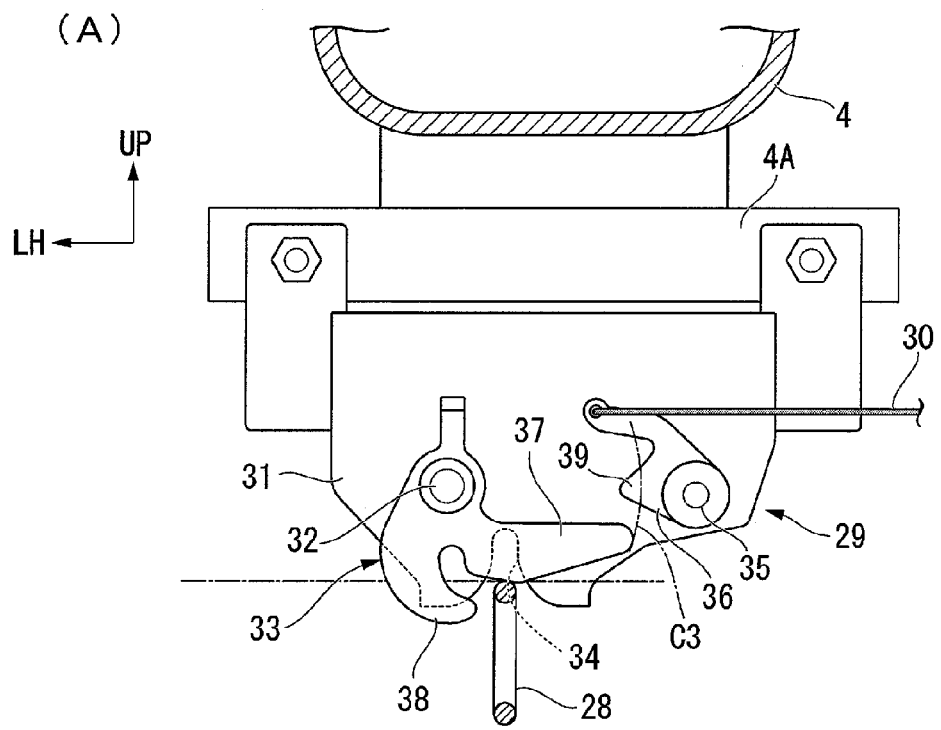
Figure 4:
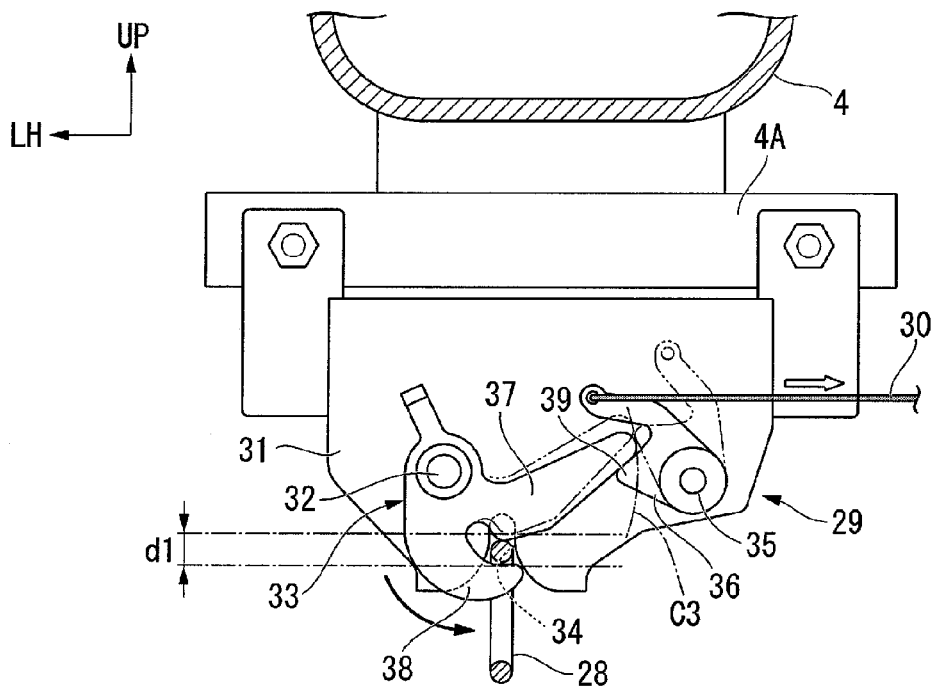

FIGS. 4(A) and 4(B) show the locking means 24 which is viewed along the A-A line in FIG. 2. The locking means 24 will be described below in detail. The striker 28 is formed in a U-shape, and both end portions of the U-shape are aligned with the vertical direction and connected to an outer wall surface of the case 21. In addition, a bottom portion of the U-shape of the striker 28 protrudes forward and upward.

Meanwhile, a hook member is provided, (a latch body 33 which will be described later) to be engaged with and disengaged from the striker 28. The latch 29 is configured to come into contact with the striker 28 when the battery 20 swings upward from below pivotally around the engagement position P1, to be pressed upward by a predetermined amount from the state of contact, then to move to an operation to lock the striker 29, and to lock the striker 28. Moreover, a wire 30 is connected to the latch 29, and the lock between the latch 29 and the striker 28 is released by pulling this wire 30.

The latch 29 includes a plate 31, and a latch shaft 32 provided on the plate 31 in a direction orthogonal to a planar direction of the plate 31. The latch body 33 is swingably supported by the latch shaft 32. The plate 31 is supported by a lower part of a bracket 4A, which is provided on the lower surface of the main frame 4 and directed downward. As shown in FIG. 2, the plate 31 extends forward and downward. In other words, the planar direction thereof extends substantially along the swing loci C1, C2. Meanwhile, a guide groove portion 34 recessed upward and guiding the striker 28 upward is formed substantially in the center of a lower part of the plate 31. The latch shaft 32 is provided at an upper left position laterally deflected from the guide groove portion 34.

An arm shaft 35 extending parallel to the latch shaft 32 is provided on the plate 31 in an upper right region relative to the guide groove portion 34, and a positioning arm 36 is swingably supported by the arm shaft 35. The arm shaft 35 is arranged substantially at the same level as the latch shaft 32 in the vehicle width direction, and the positioning arm 36 extends to the left toward the guide groove portion 34.

The latch body 33 includes: a contact arm 37 which extends outward in a radial direction of the latch shaft 32, and with which the striker 28 comes into contact from below. A lock arm 38 extends outward in another radial direction of the latch shaft 32, and is configured to lock the striker 28 that enters the guide groove portion 34. The latch body 33 is biased by biasing means whose illustration is omitted, and is retained in a state that the contact arm 37 crosses the guide groove portion 34 and is located above the striker 28 while the lock arm 38 is located in a position where the lock arm 38 does not overlap the guide groove portion 34 in the vertical direction, and recedes from the striker 28.

The positioning arm 36 includes a lock protrusion for locking the contact arm 37. Moreover, the positioning arm 36 is arranged in such a manner that a tip of this lock protrusion 39 is directed to the latch shaft 32. In addition, the tip of the lock protrusion 39 is located on a turning locus C3 of a tip of the contact arm 37 drawn when the striker 28 is brought into contact with the contact arm 37 from below and the contact arm 37 is swung upward.

Moreover, the positioning arm 36 is biased downward by biasing means whose illustration is omitted, and the tip of the lock protrusion 39 is thus maintained at a position on the turning locus C3 of the tip of the contact arm 37. Meanwhile, the wire 30 is connected to the positioning arm 36, and the positioning arm 36 can accordingly swing upward by pulling the wire 30. When the positioning arm 36 is swung upward by using the wire 30, the tip of the lock protrusion 39 recedes from the turning locus C3 of the tip of the contact arm 37.

The latch 29 described above enters into an operation to lock the striker 28 when the striker 28 comes into contact with the contact arm 37 from below and the contact arm 37 is pressed upward and swung upward as shown in FIG. 4(A). Then, when the contact arm 37 is pressed upward by a predetermined amount (dl in FIG. 4(B), for example) and is swung upward whereby the tip of the contact arm 37 runs over the lock protrusion 39 of the positioning arm 36, the lock protrusion 39 moves downward as shown in FIG. 4(B), thereby establishing a state where the downward swing of the contact arm 37 is restricted by the lock protrusion 39.

In this state, the contact arm 37 is swung upward and is located above the striker 28 that has moved upward. In addition, the lock arm 38 swings and moves to below the striker 28 that has entered the guide groove portion 34, thereby entering into a state of overlapping the guide groove portion 34 in the vertical direction. Hence, the striker 28 enters into a state of being locked by the latch 29. Accordingly, the battery 20 is fixed to the main frame 4 by the locking means 24. After the contact arm 37 is pressed upward by the predetermined amount dl and is swung upward whereby the tip of the contact arm 37 runs over the lock protrusion 39 of the positioning arm 36 as described above, the contact arm 37 is more specifically locked by the lock protrusion 39 in a state of moving slightly downward from the state immediately after running over.

In order to release the locked state between the latch 29 and the striker 28, the tip of the lock protrusion 39 is moved away from a turning locus of the tip of the contact arm 37 by swinging the positioning arm 36 upward by using the wire 30 as indicated with an arrow near the wire 30 in FIG. 4(B). In this case, since the lock protrusion 39 moves away from the tip of the contact arm 37, the contact arm 37 is swung downward by the biasing means, and the lock arm 38 returns to the position not overlapping the guide groove portion 34 in the vertical direction. Thereby, the striker 28 is allowed to be pulled up out of the guide groove portion 34.

The wire 30 is connected to a handlebar lock mechanism 40 configured to restrict a turn of the handlebar 15. By manipulating this handlebar lock mechanism 40, the wire 30 is pulled and the locking means 24 is released.

The handlebar lock mechanism 40 will be described below in detail. With reference to FIG. 2, FIG. 3, and FIG. 5 to FIG. 7, the handlebar lock mechanism 40 includes a cylinder 42 having a keyhole 41 to allow insertion of a key and to enable a turning operation to be performed on the inserted key. A support column 43 protrudes outward in a radial direction of the cylinder 42 from an outer peripheral surface of the cylinder 42. A stay 44 is fixed to an outer peripheral surface of an upper part of the head pipe 3, extending to an outer peripheral side of the steering shaft 12, and configured to make the cylinder 42 supported by the head pipe 3 by fixing the support column 43 in such a manner as to align the support column 43 with a diametrical direction of the steering shaft 12. A pin member 45 is configured to protrude from the support column 43 toward the steering shaft 12 by the turning operation of the key inserted into the keyhole 41. A handlebar lock restricting member 46 is located away from the outer peripheral surface of the steering shaft 12 and extends in a circumferential direction of the steering shaft 12. A battery lock restricting member 47 is located away from the outer peripheral surface of the steering shaft 12 and extends in the circumferential direction of the steering shaft 12.

Figure 5:
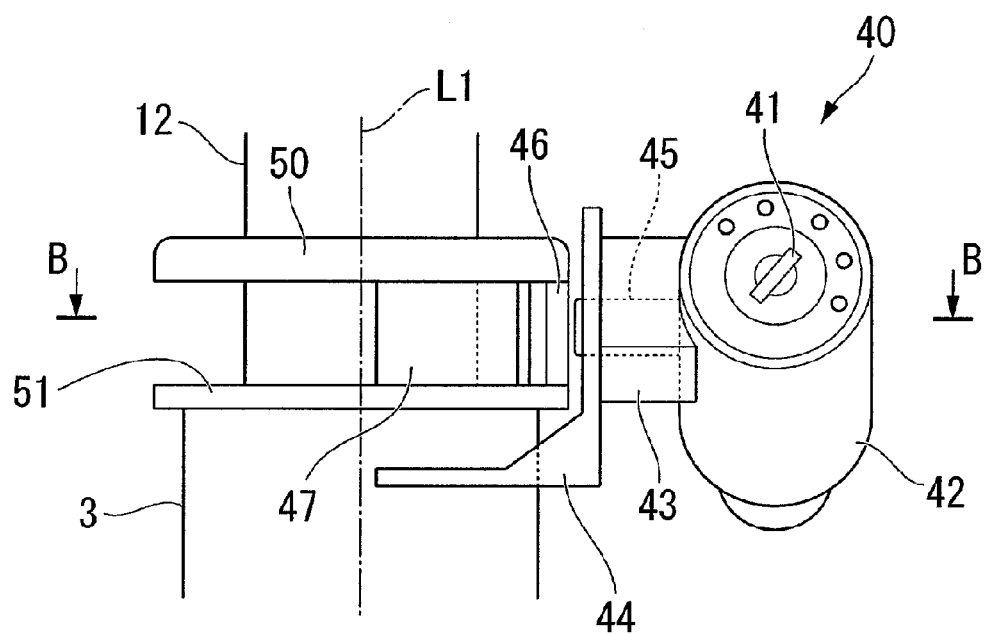
FIG. 5 is a view showing a handlebar lock mechanism included in the saddle riding type electric vehicle.
Figure 7:
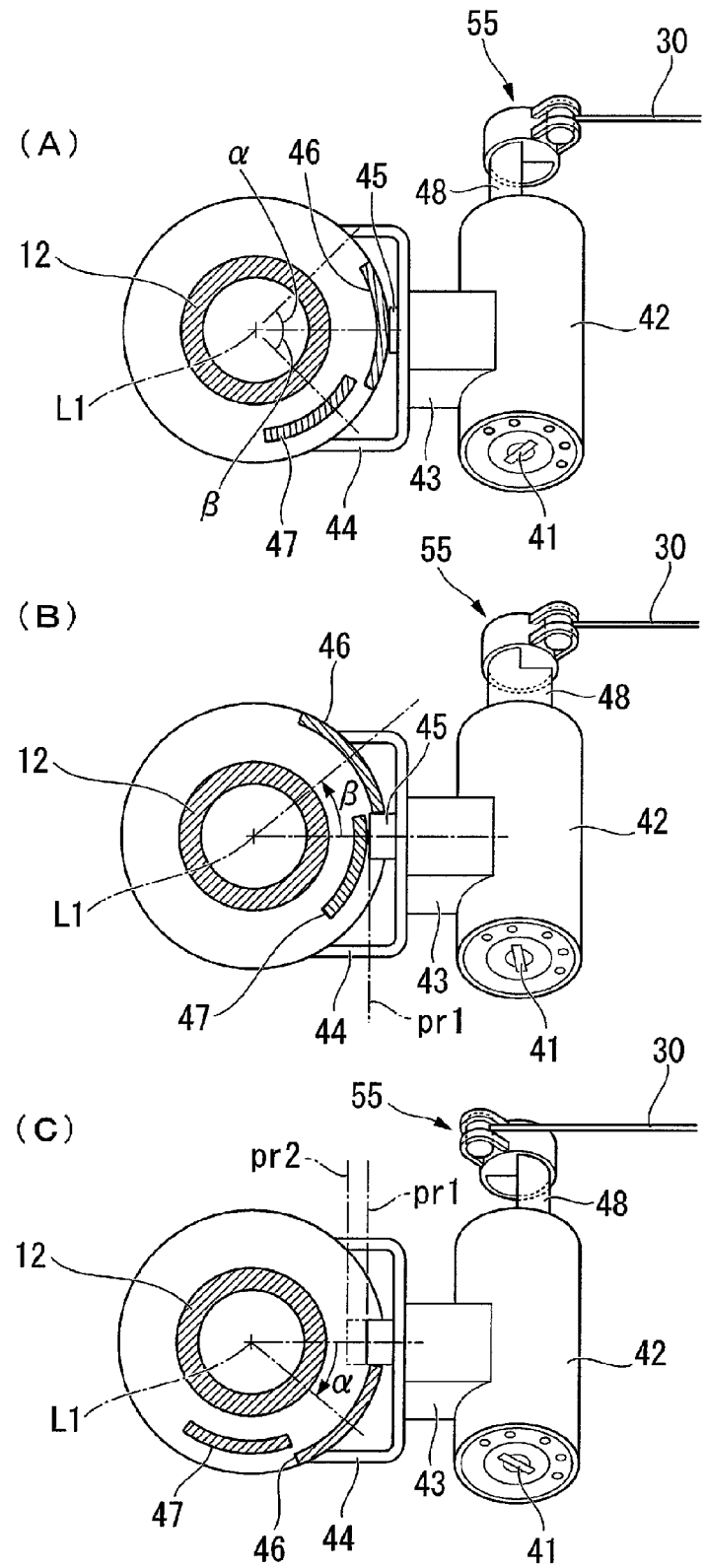

As shown in FIG. 5, the handlebar lock restricting member 46 and the battery lock restricting member 47 are inserted between an upper plate 50 and a lower plate 51, which are fixed to the outer peripheral surface of the steering shaft 12 and arranged vertically, and are fixed to the outer plate 50 and the lower plate 51. Accordingly, when the steering shaft 12 is turned, the handlebar lock restricting member 46 and the battery lock restricting member 47 are turned in conjunction with the steering shaft 12. In addition, as shown in FIG. 7, the battery lock restricting member 47 is placed in a position which is inward of the handlebar lock restricting member 46 in a radial direction of the steering shaft 12, and where at least part of the battery lock restricting member 47 does not overlap the handlebar lock restricting member 46 when viewed in the radial direction. Although FIG. 7 shows the handlebar lock restricting member 46 and the battery lock restricting member 47 in the form of cross sections taken along the B-B line in FIG. 5, the other regions are not shown in the cross sections for the convenience of description.

Figure 6:
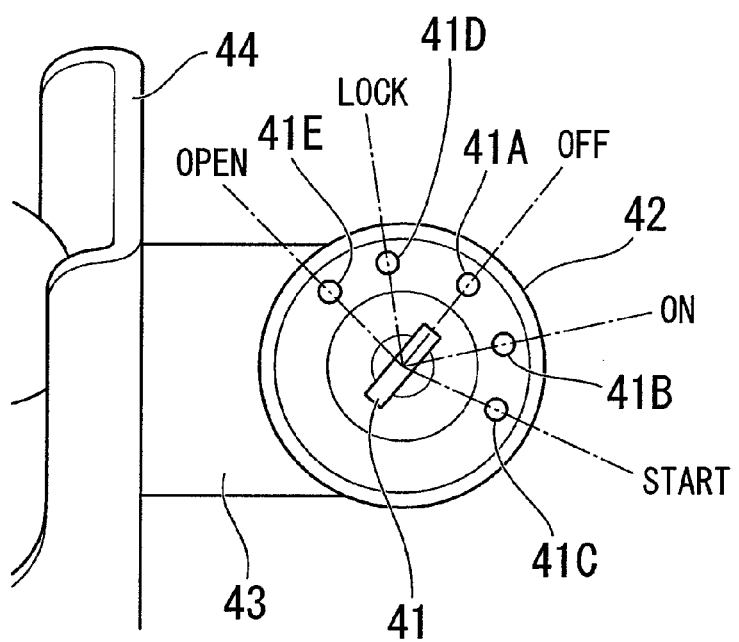
FIG. 6 is a view showing a key cylinder in the handlebar lock mechanism.

As shown in FIG. 6, the cylinder 42 is configured to perform specific operations related to the vehicle by moving the pin member 45 back and forth, establishing a link with a relay circuit or the like, and so forth by means of turning operations of the key from a handlebar lock position (LOCK) 41D immediately after the key is inserted into the keyhole 41 by specific angles. To be more precise, the cylinder 42 enables the turning operations of the key which include turning the key clockwise on the sheet surface from the handlebar lock position 41D by a predetermined angle to an off position (OFF) 41A, and further turning the key clockwise on the sheet surface from the off position 41A to an on position (ON) 41B. Further turning the key clockwise on the sheet surface moves from the on position 41B to a start position (START) 41C. Turning the key counterclockwise on the sheet surface enables movement from the handlebar lock position 41D to a battery lock release position (OPEN) 41E.

Regarding this saddle riding type electric vehicle 1, while the key is in the on position 41B, the electric power is not supplied to the electric motor M being a drive source, but is supplied to various electric systems including a brake lamp, indicators, and the like. While the key is in the start position 41C, the electric power is supplied to the electric motor M in accordance with the manipulation of an accelerator by a driver. While the key is in the handlebar lock position 41D, it is possible to perform handlebar lock. While the key is in the off position 41A, the handlebar lock can be released. While the key is in the battery lock release position 41E, the locking means 24 can be released. As described above, in this embodiment, the handlebar lock mechanism 40 can set the handlebar 15 in a handlebar locked state and release the locking means 24 by operating the key inserted in the key hole 41 in the cylinder 42. In addition, the handlebar lock mechanism 40 can also switch the start and stop of the saddle riding type electric vehicle 1.

As shown in FIGS. 7(A)-7(C), the cylinder 42 includes a shaft portion 48 to be turned by the operations of the key, which is provided in such a manner as to protrude from an end portion of the cylinder 42 which is opposite from the keyhole 41. Moreover, the wire 30 is pulled by turning this shaft portion 48.

In handlebar lock mechanism 40, when the key in the cylinder 42 is turned to the handlebar lock position 41D, the pin member 45 protrudes toward the steering shaft 12, and is located in a first protruding position pr1 shown in FIG. 7(B), and comes into engagement with the handlebar lock restricting member 46, thereby restricting the turn of the steering shaft 12 and establishing the handlebar locked state.

When the key is turned to the battery lock release position 41E, the pin member 45 comes to a second protruding position pr2 (see FIG. 7(C)) where the pin member 45 protrudes further from the protruding position (see the first protruding position pr1 in FIG. 7(B)) corresponding to the handlebar lock position 41D. Then, the shaft portion 48 pulls the wire 30 while the pin member 45 is in transition from the first protruding position pr1 to the second protruding position pr2, thereby releasing the locking means 24.

A handlebar lock structure formed of the pin member 45 and the handlebar lock restricting member 46 will be described below in detail. As shown in FIG. 7(A), while the handlebar 15 is upright in the unturned state, the pin member 45 is opposed to the handlebar lock restricting member 46, and is thus restricted so as not to protrude further inward than the handlebar lock restricting member in the radial direction of the steering shaft 12. Accordingly, the handlebar lock cannot be established while the handlebar 15 is completely in the unturned state.

On the other hand, as shown in FIGS. 7(B) and 7(C), the handlebar lock restricting member 46 is fixed to the steering shaft 12 in such a manner as to deviate from a protruding space of the pin member 45 (in other words, as not to be opposed to the pin member 45 any longer) when the handlebar 15 is turned to the left or right by a predetermined angle (an angle α to the left or an angle β to the right) or more from the unturned state. Accordingly, when the handlebar 15 is turned to the left by the predetermined angle α or more, or to the right by the predetermined angle β or more, the pin member 45 is allowed to protrude to the inside of the handlebar lock restricting member 46 in the radial direction of the steering shaft 12.

Then, in this allowable state, when the operation of the key moves the pin member 45 to the first protruding position pr1 where the pin member 45 protrudes further inward than the handlebar lock restricting member 46 in the radial direction of the steering shaft 12, the pin member can be located beside the handlebar lock restricting mechanism 46 in the circumferential direction of the steering shaft 12. Accordingly, the handlebar lock mechanism 40 is set in the handlebar locked state when the steering shaft 12 is turned from the state, in which the handlebar 15 is turned to the left by the predetermined angle α or more or to the right by the predetermined angle β or more, to the upright state, since the handlebar lock member 46 interferes with the pin member 45. The front wheel WF deviates from the swing loci C1, C2 when the handlebar 15 is turned from the unturned state to the state of being turned to the left by the predetermined angle α or more or to the right by the predetermined angle β or more.

In a structure for releasing the locking means 24 in the handlebar lock mechanism 40, the shaft portion 48 of the cylinder 42 pulls the wire 30 while the pin member 45 is in transition from the first protruding position pr1 to the second protruding position pr2, thereby releasing the locking means 24. Moreover, this shaft portion 48 is engaged with an arm member 55 for releasing the locking means 24 when the pin member 45 is located in the first protruding position pr1. Then, the shaft portion 48 provides the arm member 55 with an acting force for releasing the locking means 24 as the key is further operated in the direction which makes the pin member 45 move toward the second protruding position pr2. Thus, the arm member 55 pulls the wire 30.

In this embodiment, the handlebar lock restricting member 46 restricts the protrusion of the pin member 45 from the first protruding position pr1 to the second protruding position pr2 when the handlebar 15 is turned to the left by the predetermined angle α or more as shown in FIG. 7(B), and allows the pin member 45 to protrude from the first protruding position pr1 to the second protruding position pr2 only when the handle bar 15 is turned to the right by the predetermined angle β or more as shown in FIG. 7(C) (see the pin member 45 indicated with a chain double-dashed line in the drawing).

In other words, in this embodiment, the turning operation of the key from the handlebar lock position 41D to the battery lock release position 41E is restricted when the handlebar 15 is turned to the left by the predetermined angle α or more, while the turning operation of the key from the handlebar lock position 41D to the battery lock release position 41E is enabled only when the handlebar 15 is turned to the right by the predetermined angle β or more. In this embodiment, a turnable angle of the handlebar 15 is set at about 90° from the upright state to the left or right. Even if the handlebar 15 is turned to the left by nearly 90°, the handlebar lock restricting member 46 still restricts the protrusion of the pin member 45 from the first protruding position pr1 to the second protruding position pr2.

FIGS. 8(A)-8(C) include views showing cross sections in the radial direction of the shaft portion 48, which are provided for explaining a configuration of the shaft portion 48. The arm member 55 viewed in an axial direction of the shaft portion 48 is shown therein.

As shown in FIGS. 8(A)-8(C), the shaft portion 48 is formed in a semicircular cross-sectional shape, and the arm member 55 includes a cylindrical base portion 56 turnably arranged coaxially with the shaft portion 48 and an arm body 57 protruding from an outer peripheral side of the base portion 56 and connected to the wire 30.

A circular sector shaped contact portion 58 having the center along an axial line of the shaft portion 48 and a central angle of about 90° is formed on an inner peripheral surface of the base portion 56 in such a manner as to protrude inward in the radial direction of the base portion 56, and a tip of the shaft portion 48 is inserted into the base portion 56 in such a manner as to avoid the contact portion 58. To be more precise, while not being turned by the operation of the key, the shaft portion 48 is inserted in the base portion 56 with a diametrical side of its semicircular shape placed along one side of the circular sector shaped contact portion 58 (a state shown in FIG. 8(A)).

Figure 8:
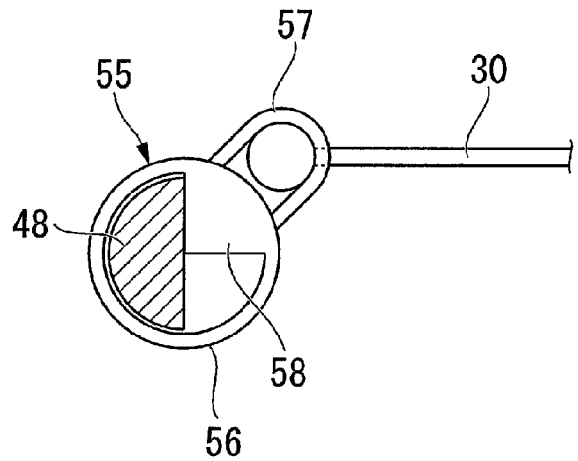
Figure 8:
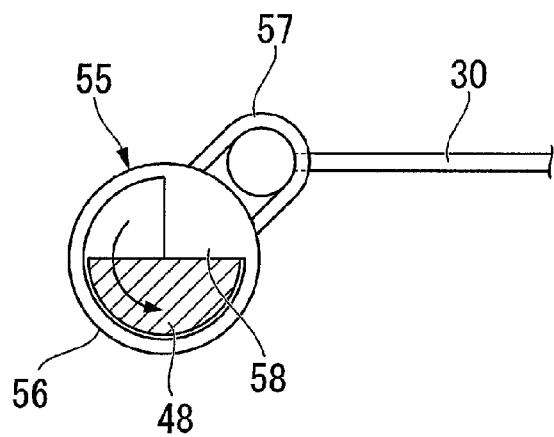
Figure 8:
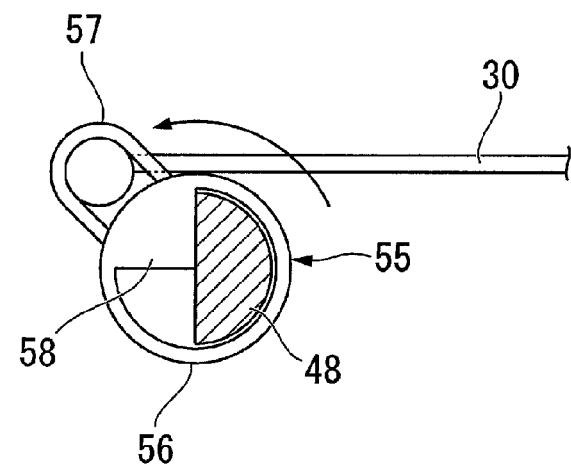

When the key in the cylinder 42 is turned from the off position 41A toward the handlebar lock position 41D and the battery lock release position 41E, the shaft portion 48 is turned counterclockwise on the sheet surface in FIG. 8. FIG. 8(A) shows the state where the key is located in the off position 41A of the cylinder 42. In this state, the shaft portion 48 does not come into contact with the contact portion 58 in the counterclockwise direction on the sheet surface. Moreover, FIG. 8(B) shows the state in which the key in the cylinder 42 is turned to the handlebar lock position 41D. In the state shown in FIG. 8(B), the shaft portion 48 is turned inside the base portion 56 and comes into engagement (contact) with the contact portion 58 in the counterclockwise direction on the sheet surface. In other words, the shaft portion 48 is engaged with a side of the circular sector shaped contact portion 58 which is different from the side of the circular sector shaped contact portion 58 with which the shaft portion 48 not turned by the operation of the key is in contact.

FIG. 8(C) shows a state where the key in the cylinder 42 is further turned to the battery lock release position 41E. In the state shown in FIG. 8(C), the shaft portion 48 turns the base portion 56 by way of the contact portion 58, and the arm body 57 pulls the wire 30. In this way, the locking means 24 works in conjunction with the operation of the key in the cylinder 42, and is released when the pin member 45 is located in the second protruding position pr2.

Attaching and detaching operations of the battery 20 in the saddle riding type electric vehicle 1 will be described below. When detaching the battery 20, the handlebar 15 (the steering shaft 12) is first turned by the predetermined angle β or more as shown in FIG. 7(C). Then, with reference to FIG. 6, the key in the cylinder 42 is turned from the handlebar lock position 41D to the battery lock release position 41E. Thus, the state of the latch 29 locking the striker 28 is released, and the state in which the battery 20 is fixed to the main frame 4 by the locking means 24 is released.

Further, referring to FIG. 3, the down frame 6, the bottom frame 7, and the battery 20 are swung downward pivotally around the engagement position P1 where the bottom frame 7 is engaged with the pivot frames 5. In this case, although illustration is omitted therein, the cable 82 is once brought into a tensile state to restrict the swing of the down frame 6, the bottom frame 7, and the battery 20. At this stage, the roller 25 does not touch the ground. Then, the hook 84 is detached while the down frame 6, the bottom frame 7, and the battery 20 are swung upward to the front of a lock position of the latch 29 with the striker 28. Here, the down frame 6, the bottom frame 7, and the battery 20 are swung downward while the handle portion 80 is gripped, and thereby the roller 25 is grounded. Thereafter, the hook 26 of the bottom frame 7 is detached from the bar 27 between the pivot frames 5. Then, the down frame 6, the bottom frame 7, and the battery 20 are detached from the vehicle body.

When attaching the battery 20, the down frame 6, the bottom frame 7, and the battery 20 are moved to an appropriate place while keeping the roller 25 in touch with the ground, and the hook 26 of the bottom frame 7 is engaged with the bar 27 between the pivot frames 5. Then, the battery 20 is attached to the vehicle body by: swinging the down frame 6, the bottom frame 7, and the battery 20 upward pivotally around the engagement position P1 where the bottom frame 7 is engaged with the pivot frames 5; and locking the striker 28 on the battery 20 with the latch 29 on the main frame 4. Thus, the battery 20 is supported by the main frame 4 by way of the striker 28 and the latch 29.

As described above, the saddle riding type electric vehicle 1 of this embodiment includes the main frame 4 extending rearward from the head pipe 3. The pivot frames 5 extend downward from the rear end of the main frame 4. The down frame 6 extends in the vertical direction below the front part of the main frame 4. The bottom frame 7 extends rearward from the lower end of the down frame 6 and has the rear end connected to the pivot frames 5. The battery 20 is provided in a detachably-attached manner in the space formed by the main frame 4, the down frame 6, the bottom frame 7, and the pivot frames 5.

Moreover, the battery 20 is integrated with the down frame 6 and the bottom frame 7. The bottom frame 7 is engaged with the pivot frames 5 in a detachably-attached manner by the engaging means 23 between the bottom frame 7 and the pivot frames 5. The battery 20 is fixed to the main frame 4 in a detachably-attached manner by the locking means 24 between the battery 20 and the main frame 4. When the locking means 24 is released and the fixation of the battery 20 to the main frame 4 is released, the down frame 6, the bottom frame 7, and the battery 20 are allowed to swing pivotally around the engagement position P1 where the bottom frame 7 is engaged with the pivot frames 5. The steering shaft 12 is turnably supported by the head pipe 3 and the handle bar 15 is provided on the upper part of the steering shaft 12, while the front wheel WF is provided on the lower part thereof. The wheel WF is located in front of the down frame 6. While the handlebar 15 is in the unturned state, the front wheel WF is located on the swing loci C1, C2 of the down frame 6 and the battery 20 drawn when the down frame 6, the bottom frame 7, and the battery swing pivotally around the engagement position P1, thereby restricting the detachment of the battery 20 from the vehicle body. While the handlebar 15 is in the turned state, the front wheel WF deviates from the swing loci C1, C2 and thereby allows the detachment of the battery 20 from the vehicle body.

Accordingly, the battery 20 integrated with the down frame 6 and the bottom frame 7 can be detached by releasing the locking means 24 for fixing the battery 20 to the main frame 4, and swinging the down frame 6, the bottom frame 7, and the battery 20 pivotally around the engagement position P1 between the bottom frame 7 and the pivot frames 5. The bottom frame 7 is then detached from the pivot frames 5. Thus, the operation to detach the battery 20, which is a heavy object, can be performed relatively smoothly and workability of the operation to detach the battery 20 can be improved.

In addition, the configuration in which the battery 20 cannot be detached unless the predetermined procedures are performed is established by allowing the swing and detachment of the battery 20 when the handlebar 15 is turned. Thus, an anti-theft effect of the battery 20 can easily be obtained.

Further, although the front wheel WF is located on the swing loci of the down frame 6 and the battery 20 while the handlebar 15 is in the unturned state, the battery 20 can be detached by turning the handlebar 15. Thus, the battery 20 in the state attached to the vehicle body can have a structure enlarged toward the wheel, and a capacity of the battery can also be secured.

This saddle riding type electric vehicle 1 further includes the handlebar lock mechanism 40 configured to restrict the turn of the handlebar 15. The handlebar lock mechanism 40 includes the pin member 45 configured to protrude toward the steering shaft 12 by the operation of the key and the handlebar lock restricting member 46 placed on the outer circumference of the steering shaft 12 and extending in the circumferential direction of the steering shaft 12.

At least while the handlebar 15 is in the unturned state, the pin member 45 is opposed to the handlebar lock restricting member 46, and the protrusion of the pin member 45 to the inside of the handlebar lock restricting member 46 in the radial direction of the steering shaft 12 is accordingly restricted. The handlebar lock restricting member 46 is placed in such a manner as not to be opposed to the pin member 45 any longer when the handlebar 15 is turned from the unturned state to the left or right by the predetermined angle α, β or more. When the handlebar 15 is turned to the left or right by the predetermined angle α, β or more, the pin member 45 is allowed to protrude to the inside of the handlebar lock restricting member 46 in the radial direction of the steering shaft 12. When the pin member 45 comes to the first protruding position pr1 where the pin member 45 protrudes further inward than the handlebar lock restricting member 46 in the radial direction of the steering shaft 12 by the operation of the key, the pin member 45 is located beside the handlebar lock restricting member 46 in the circumferential direction of the steering shaft 12, thereby setting the handlebar 15 into the handlebar locked state.

Moreover, the front wheel WF deviates from the swing loci C1, C2 when the handlebar 15 is turned from the unturned state to the left or right by the predetermined angle α, β or more. Here, the locking means 24 can be released only by: locating the pin member 45 of the handlebar lock mechanism 40 in the first protruding position pr1; setting the handlebar 15 into the handlebar locked state; and then performing the predetermined operations on the handlebar lock mechanism 40.

Only while in the handlebar locked state, this configuration releases the lock mechanism, and allows the swing and detachment of the battery 20. Thus, it is possible to prevent an erroneous operation of a user from causing the battery 20 to interfere with the front wheel WF.

Specifically, in this embodiment, the pin member 45 is allowed to protrude to the second protruding position pr2 where the pin member 45 protrudes further inward than in the first protruding position pr1 in the radial direction of the steering shaft 12 in the state where the handlebar 15 is turned from the unturned state to the right, out of the left and right, by the predetermined angle β or more. Here, the locking means 24 is configured to work in conjunction with the operation of the key after establishing the handlebar locked state, and to be released when the pin member 45 is located in the second protruding position pr2.

Thereby, the locking means 24 and the handlebar lock mechanism 40 are configured to work with each other, and the locking means 24 is configured to be released after the handlebar locked state is established. This makes it possible to reliably prevent an erroneous operation of a user from causing the battery 20 to interfere with the front wheel WF.

In addition, the handlebar lock mechanism 40 includes the cylinder 42 into which the key is to be inserted and in which the inserted key is turnable. The cylinder 42 includes the shaft portion 48 to be turned by the operation of the key. The shaft portion 48 is engaged with the arm member 55 for releasing the locking means 24 when the pin member 45 is located in the first protruding position pr1. The shaft portion 48 provides the arm member 55 with the acting force for releasing the locking means 24 when the key is further operated in such a manner as to move the pin member 45 toward the second protruding position pr2.

This configuration makes it possible to release the locking means 24 by use of the turn of the shaft portion 48 to be turned in conjunction with the operation of the key.

The battery lock restricting member 47 that extends in the circumferential direction of the steering shaft 12 is further fixed to the outer circumference of the steering shaft 12. The battery lock restricting member 47 is located in the position which is inward of the handlebar lock restricting member 46 in the radial direction of the steering shaft 12, and where at least part of the battery lock restricting member 47 does not overlap the handlebar lock restricting member 46 when viewed in the radial direction. In addition, the battery lock restricting member 47 is located in the position where the protrusion of the pin member 45 from the first protruding position pr1 to the second protruding position pr2 is restricted in the state where the handlebar 15 is turned from the unturned state to the left, out of the left and right, by the predetermined angle α or more.

This configuration does not allow the locking means 24 to be released in the state where the handlebar 15 is turned from the unturned state to the left by the predetermined angle. Thus, it is possible to provide the configuration that enables the release of the locking means 24 only in a designated direction.

Moreover, the roller 25 configured to touch the ground at the time of releasing the locking means 24 is provided at the junction of the down frame 6 and the bottom frame 7. This makes it possible to perform the attaching and detaching operations of the battery 20 easily.

In addition to setting the handlebar 15 into the handlebar locked state and releasing the locking means 24, the handlebar lock mechanism 40 can also switch the start and stop of the saddle riding type electric vehicle 1 by operations of the key.

In this configuration, the operation of the single key makes it possible to lock the handlebar, and to release the lock mechanism, in addition to switching the start and stop. Thus, the efficient operating means can be realized.

Although an embodiment of the present invention has been described above, the present invention is not limited only to the above-described embodiment, and various modifications can be added within the scope not departing from the gist of the present invention.

Figure 9:
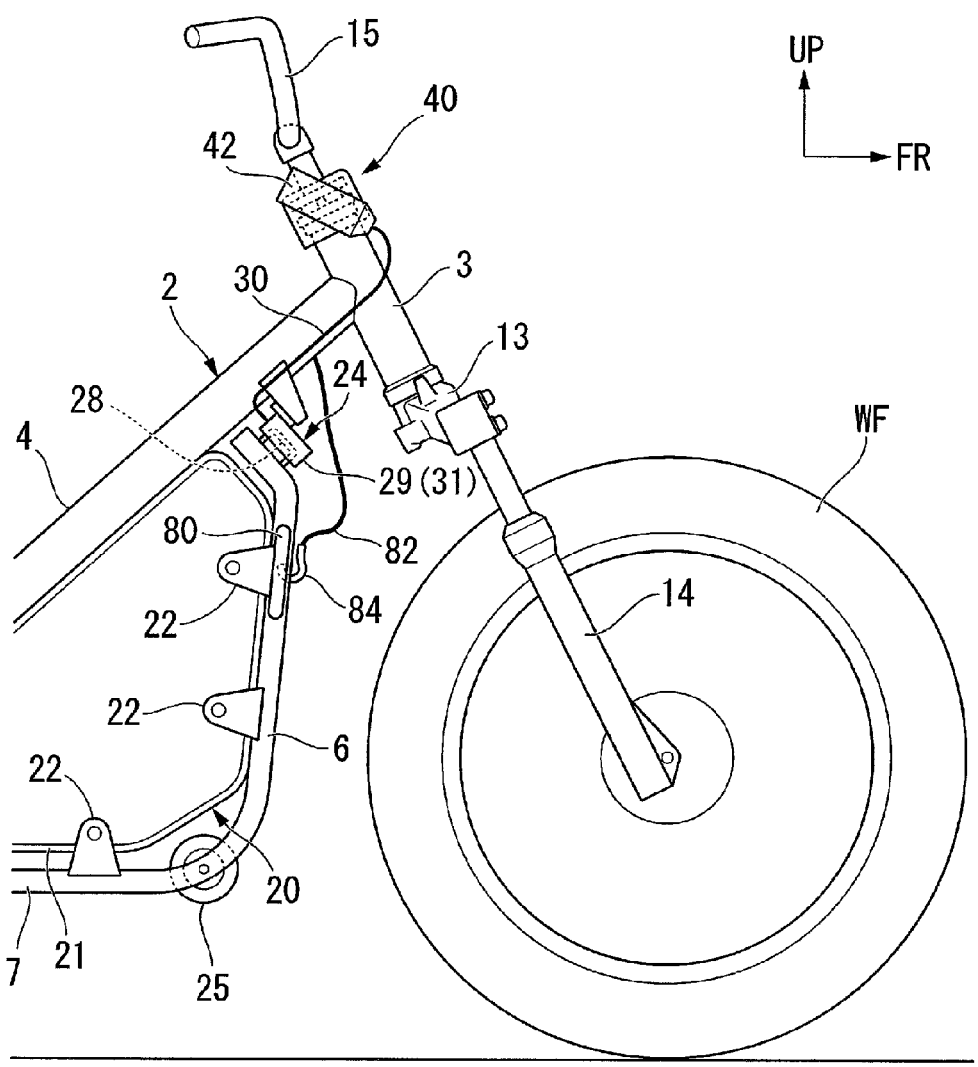
FIG. 9 is a right side view of a vehicle front part showing a modified example of the embodiment.

For example, the embodiment has described the example in which the battery 20 is fixed to the main frame 4 in a detachably attached manner. Instead, the upper part of the down frame 6 may be fixed to the main frame 4 in a detachably attached manner. In this case, specifically, the striker 28 is provided on the upper part of the down frame 6 as shown in FIG. 9 in such a manner as to be locked with the latch 29 provided on the main frame 4.

Meanwhile, the embodiment has described the example in which the locking means 24 can be released when the handle bar 15 is turned to the right. Instead, the locking means 24 can be made releasable when the handlebar 15 is turned to the left.

EXPLANATION OF THE REFERENCE NUMERALS

1 SADDLE RIDING TYPE ELECTRIC VEHICLE
3 HEAD PIPE
4 MAIN FRAME
5 PIVOT FRAME
6 DOWN FRAME
12 STEERING SHAFT
15 HANDLEBAR
20 BATTERY
23 ENGAGING MEANS
24 LOCKING MEANS
40 HANDLEBAR LOCK MECHANISM
42 CYLINDER
45 PIN MEMBER
46 HANDLEBAR LOCK RESTRICTING MEMBER
47 BATTERY LOCK RESTRICTING MEMBER
48 SHAFT PORTION
55 ARM MEMBER
WF FRONT WHEEL

The invention claimed is:

1. A saddle riding type electric vehicle, comprising:
a main frame extending rearward from a head pipe;
a pivot frame extending downward from a rear end of the main frame;
a down frame extending in a vertical direction below a front part of the main frame; and
a bottom frame extending rearward from a lower end of the down frame and having a rear end connected to the pivot frame, wherein a battery is provided in a detachably-attached manner in a space formed by the main frame, the down frame, the bottom frame, and the pivot frame, wherein
the battery is integrated with the down frame and the bottom frame,
the bottom frame is engaged with the pivot frame in a detachably-attached manner by engaging means provided between the bottom frame and the pivot frame,
one of the down frame and the battery is fixed to the main frame in a detachably-attached manner by a lock provided between the main frame and the down frame or the battery,
the down frame, the bottom frame, and the battery are configured to swing pivotally around an engagement position where the bottom frame is engaged with the pivot frame when the fixation of the down frame or the battery to the main frame is released upon release of the lock, said vehicle further comprising
a steering shaft turnably supported by the head pipe;
a handlebar provided above the steering shaft;
a wheel provided below the steering shaft, the wheel being located in front of the down frame,
wherein when the handlebar is in an unturned state, the wheel restricts detachment of the battery from a vehicle body by being located on at least any one of swing loci of the down frame, the bottom frame, and the battery drawn when the down frame, the bottom frame, and the battery swing pivotally around the engagement position, and
wherein when the handlebar is in a turned state, the wheel deviates from the swing locus and thereby enables detachment of the battery from the vehicle body.

2. The saddle riding type electric vehicle according to claim 1, further comprising:
a handlebar lock mechanism configured to restrict a turn of the handlebar, said handlebar lock mechanism including a pin member configured to protrude toward the steering shaft by an operation of a key; and
a handlebar lock restricting member placed on an outer circumference of the steering shaft and extending in a circumferential direction of the steering shaft,
wherein when the handlebar is in the unturned state, the pin member is opposed to the handlebar lock restricting member, and is restricted so as not to protrude further inward than the handlebar lock restricting member in a radial direction of the steering shaft,
wherein, in a state where the handlebar is turned from the unturned state to left or right by at least a predetermined angle, the handlebar lock restricting member is located not to be opposed to the pin member,
wherein, in a state where the handlebar is turned to the left or right by at least the predetermined angle, the pin member is configured to protrude further inward than the handlebar lock restricting member in the radial direction of the steering shaft, and sets the handlebar into a handlebar locked state in such a way that the pin member is located beside the handlebar lock restricting mechanism in the circumferential direction of the steering shaft when coming to a first protruding position where the pin member protrudes further inward than the handlebar lock restricting mechanism in the radial direction of the steering shaft by an operation of the key,
wherein the wheel deviates from the swing locus in the state where the handlebar is turned from the unturned state to the left or right by at least the predetermined angle, and
wherein the lock is configured to be released by locating the pin member of the handlebar lock mechanism in the first protruding position thereby to set the handlebar into the handlebar locked state, and further performing a predetermined operation on the handlebar lock mechanism.

3. The saddle riding type electric vehicle according to claim 2, wherein the pin member is configured to protrude to a second protruding position where the pin member protrudes further inward than in the first protruding position in the radial direction of the steering shaft in the state where the handlebar is turned from the unturned state to the left or right by at least the predetermined angle, and
wherein the lock is configured to work in conjunction with the operation of the key, and is released when the pin member is located in the second protruding position.

4. The saddle riding type electric vehicle according to claim 3,
wherein the handlebar lock mechanism comprises a cylinder into which the key is configured to be inserted, and in which the inserted key is turnable,
wherein the cylinder includes a shaft portion configured to be turned by an operation of the key, and
wherein the shaft portion is engaged with an arm member (55) configured to release the lock when the pin member comes to the first protruding position, and the shaft portion provides the arm member with an acting force for releasing the locking means when the key is further operated to move the pin member toward the second protruding position.

5. The saddle riding type electric vehicle according to claim 3, further comprising:
a battery lock restricting member extending in the circumferential direction of the steering shaft, and is further fixed to the outer circumference of the steering shaft,
wherein the battery lock restricting member is located in a position which is inward of the handlebar lock restricting member in the radial direction of the steering shaft, and where at least part of the battery lock restricting member does not overlap the handlebar lock restricting member in the radial direction, and
wherein the battery lock restricting member is placed in a position where the battery lock restricting member restricts protrusion of the pin member from the first protruding position to the second protruding position in the state where the handlebar is turned from the unturned state to one of the left and right by at least the predetermined angle.

6. The saddle riding type electric vehicle according to claim 3, wherein the handlebar lock mechanism is configured to switch start and stop of the saddle riding type electric vehicle by operations of the key, and to set the handlebar into the handlebar locked state and releasing the lock.

7. The saddle riding type electric vehicle according to claim 1, further comprising
a roller configured to be grounded when the lock is released, said roller means being provided at a junction of the down frame and the bottom frame.

8. An electric vehicle, comprising:
main frame means extending rearward from a head pipe, said main frame means for supporting vehicle components thereupon;
pivot frame means extending downward from a rear end of the main frame means, said pivot frame means supporting pivoting components thereupon;
down frame means extending in a vertical direction below a front part of the main frame means; and
bottom frame means extending downward from a lower portion of the down frame means, and having a rear end connected to the pivot frame means, wherein battery means for providing electric power is disposed in a detachably-attached manner in a space formed by the main frame means, the down frame means, the bottom frame means, and the pivot frame means,
wherein the battery means is integrated with the down frame means and the bottom frame means, wherein the bottom frame means is detachably engaged with the pivot frame means by engaging means provided between the bottom frame means and the pivot frame means,
wherein one of the down frame means and the battery means is detachably fixed to the main frame means by locking means provided between the main frame means and the down frame means or the battery means,
wherein the down frame means, the bottom frame means, and the battery means, are configured to swing pivotally around an engagement position where the bottom frame means is engaged with the pivot frame means when fixation of the down frame means or the battery means to the main frame means is released upon release of the locking means, said vehicle further comprising
steering shaft means for being turnably supported by the head pipe;
handlebar means disposed above the steering shaft means;
wheel means disposed below the steering shaft means, the wheel means being located in front of the down frame means,
wherein, when the handlebar means is in an unturned state, the wheel means restricts detachment of the battery means from a vehicle body by being located on at least any one of swing loci of the down frame means, the bottom frame means, and the battery means drawn when the down frame means, the bottom frame means, and the battery means swing pivotally around the engagement position, and
wherein, when the handlebar means is in a turned state, the wheel means deviates from the swing loci and thereby enables detachment of the battery means from the vehicle body.

9. The electric vehicle according to claim 8, further comprising:
handlebar lock means for restricting a turn of the handlebar, said handlebar lock means including pin means for protruding toward the steering shaft means by an operation of a key; and
handlebar lock restricting means for restricting the handlebar lock means, said handlebar lock restricting means disposed on an outer circumference of the steering shaft means and extending in a circumferential direction of the steering shaft means,
wherein when the handlebar means is in the unturned state, the pin means is opposed to the handlebar lock restricting means, and is restricted so as not to protrude further inward than the handlebar lock restricting means in a radial direction of the steering shaft means,
wherein in a state where the handlebar means is turned from the unturned state to left or right by at least a predetermined angle, the handlebar lock restricting means is located not to be opposed to the pin means,
wherein, in a state where the handlebar means is turned to the left or right by at least the predetermined angle, the pin means is configured to protrude further inward than the handlebar lock restricting means in the radial direction of the steering shaft means, and sets the handlebar means into a handlebar means locked state in such a way that the pin means is located beside the handlebar lock restricting means in the circumferential direction of the steering shaft means when coming to a first protruding position where the pin means protrudes further inward than the handlebar lock restricting means in the radial direction of the steering shaft means by an operation of the key,
wherein the wheel means deviates from the swing locus in the state where the handlebar is turned from the unturned state to the left or right by at least the predetermined angle, and
wherein the locking means is configured to be released by locating the pin means of the handlebar lock means in the first protruding position thereby to set the handlebar means into the handlebar means locked state, and further performing a predetermined operation on the handlebar lock means.

10. The electric vehicle according to claim 9, wherein the pin means is configured to protrude to a second protruding position where the pin means protrudes further inward than in the first protruding position in the radial direction of the steering shaft means in the state where the handlebar means is turned from the unturned state to the left or right by at least the predetermined angle, and
wherein the locking means is configured to work in conjunction with the operation of the key, and is released when the pin means is located in the second protruding position.

11. The electric vehicle according to claim 10, wherein the handlebar lock means comprises a cylinder into which the key is configured to be inserted, and in which the inserted key is turnable, wherein the cylinder includes a shaft means for being turned by the operation of the key, and wherein the shaft means is engaged with an arm means for releasing the locking means when the pin means comes to the first protruding position, and the shaft means is also for providing the arm means with an acting force for releasing the locking means when the key is further operated to move the pin means toward the second protruding position.

12. The electric vehicle according to claim 10, further comprising:

battery lock restricting means extending in the circumferential direction of the steering shaft means, said battery lock restricting means being further fixed to the outer circumference of the steering shaft means, wherein the battery lock restricting means is located in a position which is inward of the handlebar lock restricting means in the radial direction of the steering shaft, and where at least a part of the battery lock restricting means does not overlap the handlebar lock restricting means in the radial direction, and wherein the battery lock restricting means is placed in a position where the battery lock restricting means restricts protrusion of the pin means from the first protruding position to the second protruding position in the state where the handlebar means is turned from the unturned state to the one of the left and right by at least the predetermined angle.

13. The electric vehicle according to claim 10, wherein the handlebar lock means is for switching start and stop of the electric vehicle by operations of the key, and for setting the handlebar means into the handlebar means locked state and releasing the locking means.

14. The electric vehicle according to claim 8, further comprising roller means for being grounded when the locking means is released, said roller means being disposed at a junction of the down frame means the bottom frame means.

* * * * *